US007290524B2

(12) United States Patent
Kobayashi (10) Patent No.: US 7,290,524 B2
(45) Date of Patent: Nov. 6, 2007

(54) CONTROL APPARATUS AND METHOD FOR FOUR-STROKE PREMIXED COMPRESSION IGNITION INTERNAL COMBUSTION ENGINE

(75) Inventor: Tatsuo Kobayashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/592,299

(22) Filed: Nov. 3, 2006

(65) Prior Publication Data

US 2007/0107680 A1 May 17, 2007

(30) Foreign Application Priority Data

Nov. 14, 2005 (JP) ............... 2005-328618

(51) Int. Cl.
*F02B 75/02* (2006.01)
*F01L 1/34* (2006.01)

(52) U.S. Cl. .................. 123/315; 123/90.15
(58) Field of Classification Search ........... 123/315, 123/319, 320, 321, 323, 345, 347, 90.15
See application file for complete search history.

(56) References Cited

U.S. PATENT DOCUMENTS

| 5,398,502 | A | * | 3/1995 | Watanabe | ........... 60/284 |
| 6,109,225 | A | * | 8/2000 | Ogita et al. | ........... 123/90.15 |
| 2001/0027783 | A1 | * | 10/2001 | Hiraya et al. | ........... 123/568.14 |
| 2002/0108592 | A1 | * | 8/2002 | Takemura et al. | ........... 123/90.17 |
| 2004/0206321 | A1 | * | 10/2004 | Katayama | ........... 123/90.15 |
| 2004/0237917 | A1 | * | 12/2004 | Yasui et al. | ........... 123/90.15 |
| 2005/0252464 | A1 | | 11/2005 | Aikawa et al. | |

FOREIGN PATENT DOCUMENTS

| JP | A 11-132066 | 5/1999 |
| JP | A 11-264319 | 9/1999 |
| JP | A 2003-148180 | 5/2003 |
| JP | A 2005-325813 | 11/2005 |

* cited by examiner

*Primary Examiner*—John T. Kwon
(74) *Attorney, Agent, or Firm*—Oliff & Berridge, PLC

(57) ABSTRACT

A control apparatus for a four-stroke premixed compression ignition internal combustion engine opens an exhaust valve to discharge burned gas from a combustion chamber at a first exhaust-valve opening timing, and reopens the exhaust valve at a second exhaust-valve opening timing that is retarded with respect to the intake-valve opening timing. Thus, burned gas discharged from the combustion chamber flows back into the combustion chamber through the exhaust port. The control apparatus retards the second exhaust-valve opening timing as the load on the engine increases. This obviates the need to decrease the lift of the exhaust valve to decrease the amount of burned gas that is reintroduced into the combustion chamber and prevents increases in the resistance against the flow of burned gas into the combustion chamber.

24 Claims, 8 Drawing Sheets

VALVE TIMINGS IN LOW LOAD IGNITION MODE

LOW LOAD IGNITION MODE

FIG. 8B

MEDIUM/HIGH LOAD IGNITION MODE

FIG. 9A

LOW LOAD IGNITION MODE

FIG. 9B

MEDIUM/HIGH LOAD IGNITION MODE

CONTROL APPARATUS AND METHOD FOR FOUR-STROKE PREMIXED COMPRESSION IGNITION INTERNAL COMBUSTION ENGINE

INCORPORATION BY REFERENCE

The disclosure of Japanese Patent Application No. 2005-328618 filed on Nov. 14, 2005, including the specification, drawings and abstract is incorporated herein by reference in its entirety.

BACKGROUND OF THE INVENTION

1. Field of the Invention

The invention relates to a control apparatus and a control method for a four-stroke premixed compression ignition internal combustion engine that operates with high fuel efficiency when the load on the engine is high.

2. Background of the Invention

As the conventional operation mode of an internal combustion engine, a premixed compression ignition mode is known. In the premixed compression ignition mode, fuel-air charge generated in a combustion chamber is compressed so that the fuel-air charge autoignites, and burns in an extremely short period. In this mode, burned gas is generally added to the fuel-air charge to increase the temperature of the fuel-air charge.

Japanese Patent Application Publication No. JP-A-11-264319 describes a control apparatus that discharges the burned gas to an exhaust port from a combustion chamber by opening an exhaust valve during exhaust stroke, and then reintroduces the burned gas into the combustion chamber from the exhaust port by reopening the exhaust valve during intake stroke.

As the output required from the engine increases (i.e., the engine load increases), the amount of air required for combustion increases. The above-described control apparatus fixes a timing at which the exhaust valve reopens (i.e., exhaust-valve reopen timing) during the intake stroke. By reopening the exhaust valve at the fixed timing, burned gas in the amount required for combustion is introduced into the combustion chamber when the load on the engine is low. As the required output increases, the control apparatus decreases the lift of the exhaust valve when the exhaust valve reopens during the intake stroke, and decreases the cross sectional area of the exhaust port through which the burned gas is introduced into the combustion chamber. Thus, as the required output increases, the amount of burned gas introduced into the combustion chamber decreases. Accordingly, when the load on the engine is high, a sufficient amount of air is introduced into the combustion chamber.

The control apparatus reopens the exhaust valve to introduce the burned gas into the combustion chamber before a great amount of air is introduced into the combustion chamber. When the exhaust valve reopens, the pressure of the burned gas in the exhaust port is extremely high. Therefore, even if the lift of the exhaust valve (or the cross sectional area of the exhaust port) is decreased, the amount of burned gas may not be sufficiently decreased. In other words, when the amount of burned gas needs to be sufficiently decreased, the lift of the exhaust valve must be decreased to an extremely small value. Therefore, there is a possibility that a sufficient amount of air is not introduced into the combustion chamber when the load on the internal combustion engine is high.

If the lift of the exhaust valve is decreased to an extremely small value, the pumping loss is increased due to the resistance against the burned gas introduced into the combustion chamber from the exhaust port. Accordingly, it is difficult for the control apparatus to operate the internal combustion engine with high fuel efficiency while introducing as much air as required for combustion into the combustion chamber.

SUMMARY OF THE INVENTION

The invention provides a control apparatus and a control method for a four-stroke premixed compression ignition internal combustion engine that operates with high fuel efficiency when a load on the internal combustion engine increases.

According to the invention, a control apparatus is employed for a four-stroke premixed compression ignition internal combustion engine.

The control apparatus for the internal combustion engine includes an intake-valve control portion, and an exhaust-valve control portion. The intake-valve control portion opens the intake valve at an intake-valve opening timing so that an intake valve is open during at least a portion of an intake stroke, and closes the intake valve at an intake-valve closing timing. The exhaust-valve control portion includes a first exhaust-valve control portion, and a second exhaust-valve control portion. The first exhaust-valve control portion opens a first exhaust valve at a first exhaust-valve opening timing so that the first exhaust valve is open during a portion of an exhaust stroke, and closes the first exhaust valve at a first exhaust-valve closing timing that is near the exhaust top dead center. The second exhaust-valve control portion opens a second exhaust valve at a second exhaust-valve opening timing that is retarded with respect to the first exhaust-valve closing timing and the intake-valve opening timing, and is advanced with respect to the intake-valve closing timing. The second exhaust-valve control portion also closes the second exhaust valve at a second exhaust-valve closing timing. Further, the second exhaust-valve control portion retards the second exhaust-valve opening timing as the load on the internal combustion engine increases.

With this configuration, the exhaust valve is open during at least a portion of the exhaust stroke. Further, the intake valve is open during at least a portion of the intake stroke. Thus, air is introduced into the combustion chamber.

In addition, the exhaust valve is reopened at the second exhaust-valve opening timing. The second exhaust-valve opening timing is after the exhaust valve, which has been open during a portion of the exhaust stroke, closes. The second exhaust-valve opening timing is in the period in which the intake valve is open (i.e., in the intake-valve open period). Thus, the burned gas that was discharged into the exhaust port from the combustion chamber during the exhaust stroke, flows back into the combustion chamber through the exhaust port.

Only air is introduced into the combustion chamber in the period from when the intake valve opens until when the exhaust valve opens (i.e., the period from the intake-valve opening timing until the second exhaust-valve opening timing) during the intake stroke. Further, with the above-described configuration, as the load on the internal combustion engine (i.e., the required output) increases, the second exhaust-valve opening timing is retarded. This increases the amount of air that is introduced into the combustion chamber in the above-described period, obviating the need to decrease the lift of the exhaust valve to an extremely small value. As a result, when the load on the internal combustion engine increases, the internal combustion engine operates with high fuel efficiency.

In this case, the internal combustion engine may include at least two intake valves. The intake-valve control portion may open and close only one of the at least two intake valves when the load on the internal combustion engine is below a predetermined threshold value.

With this configuration, when the load on the internal combustion engine is low, only one of the at least two intake valves is opened. This increases the flow speed of air flowing into the combustion chamber from the intake port, as compared to when all of the at least two intake valves are opened. Accordingly, the fuel-air charge and the burned gas are strongly stirred in the combustion chamber. This promotes the transmission of heat from the burned gas to the fuel-air charge. Thus, the temperature of the fuel-air charge is reliably increased. As a result, the fuel-air charge reliably autoignites.

In this case, the internal combustion engine may include at least two exhaust valves. The first exhaust-valve control portion may open and close one of the at least two exhaust valves, and may retard the first exhaust-valve closing timing with respect to the intake-valve opening timing when the load on the internal combustion engine is below the predetermined threshold value. The intake-valve control portion and the first exhaust-valve control portion may select a pair of the intake valve and the exhaust valve, the distance between which is longest among distances between all pairs of the intake valve and the exhaust valve, as a pair of the intake valve and the exhaust valve that are opened and closed, when the load on the internal combustion engine is below the predetermined threshold value.

In general, both of the intake valve and the exhaust valve are open in an overlap period near the exhaust top dead center. That is, as in the above-described configuration, the first-exhaust valve closing timing is retarded with respect to the intake-valve opening timing. In the overlap period, air may flow out to the exhaust port from the combustion chamber immediately after flowing into the combustion chamber from the intake port (i.e., the "blow-by" phenomenon may occur). The air, which flows from the intake port to the exhaust port, reduces the temperature of the wall surface of the exhaust port and the temperature of the burned gas in the exhaust port.

With the above-described configuration, when one intake valve and one exhaust valve need to be opened and closed, the control apparatus selects the pair of the intake valve and the exhaust valve, the distance between which is longest among the distances between all the pairs of the intake valve and the exhaust valve. That is, the path between the opening of the intake port and the opening of the exhaust port in the selected pair is longest. This reduces the possibility that air flows out to the exhaust port from the combustion chamber immediately after flowing into the combustion chamber from the intake port (i.e., the "blow-by" phenomenon occurs). As a result, it is possible to prevent the decrease in the temperature of the burned gas in the exhaust port.

In this case, the intake-valve control portion may switch the intake valve that is opened and closed, from one intake valve to another intake valve, each time a predetermined period has elapsed, when the load on the internal combustion engine is below the predetermined threshold value. The first exhaust-valve control portion may switch the exhaust valve that is opened and closed, from one exhaust valve to another exhaust valve, each time the predetermined period has elapsed, when the load on the internal combustion engine is below the predetermined threshold value.

With this configuration, when one intake valve and one exhaust valve need to be opened and closed, the intake valve that is opened and closed is switched from one intake valve to another intake valve, each time the predetermined period has elapsed. This avoids the situation where only one of the intake valves is intensively worn, only one of the exhaust valves is intensively worn, only one of the members (for example, valve seats) that contact the intake valves is intensively worn, only one of the members (for example, valve seats) that contact the exhaust valves is intensively worn, only one side of the member that drives the intake valves is intensively worn, or only one side of the member that drives the exhaust valves is intensively worn. This improves the durability of the intake valves, the exhaust valves, and the above-described members.

In this case, the second exhaust-valve control portion may open and close both of the two exhaust valves.

With this configuration, it is possible to reduce the resistance against the burned gas introduced into the combustion chamber, as compared to when only one exhaust valve is opened. This reduces the loss caused by the introduction of the burned gas into the combustion chamber. Thus, the fuel efficiency is improved.

In this case, the control apparatus for the four-stroke premixed compression ignition internal combustion engine may further include a flow-amount adjustment valve, and an adjustment-valve control portion. The flow-amount adjustment valve is provided in an exhaust passage that includes the exhaust port. In the flow-amount adjustment valve, the opening amount is adjusted to change the cross sectional area of the exhaust passage, thereby changing the amount of gas passing through the exhaust passage. The adjustment-valve control portion controls the flow-amount adjustment valve to decrease the opening amount of the flow-amount adjustment valve as the load on the internal combustion engine decreases.

With this configuration, as the load on the internal combustion engine decreases (i.e., as the required output decreases), the opening amount of the flow-amount adjustment valve decreases. This increases the pressure of the burned gas in the exhaust passage (particularly, in the exhaust port), regardless of, for example, the shape of the exhaust passage. Thus, a sufficient amount of burned gas is introduced into the combustion chamber by opening the exhaust valve during the intake stroke. As a result, the temperature of the fuel-air charge is more reliably increased. Therefore, when the load on the internal combustion engine is low (i.e., the required output is low), the fuel-air charge more reliably autoignites.

BRIEF DESCRIPTION OF THE DRAWINGS

The above and other objects and features of the present invention will become apparent from the following description of a preferred embodiment, given in conjunction with the accompanying drawings, in which.

DETAILED DESCRIPTION OF THE INVENTION

Hereinafter, a control apparatus for an internal combustion engine according to each of embodiments of the invention will be described with reference to drawings. The control apparatus according to each of embodiments is employed for a multi-cylinder internal combustion engine (four-cylinder engine in this embodiment), which operates in a four-stroke ignition mode.

In the four-stroke ignition mode, four strokes are performed while a crankshaft rotates by 720 degrees. The four strokes are composed of an intake stroke from an exhaust top dead center (hereinafter, referred to as "TDC") to an intake bottom dead center (hereinafter, referred to as "BDC"), a compression stroke from the intake BDC to a compression TDC, an expansion stroke from the compression TDC to an expansion BDC, and an exhaust stroke from the expansion BDC to the exhaust TDC.

Figure 1:
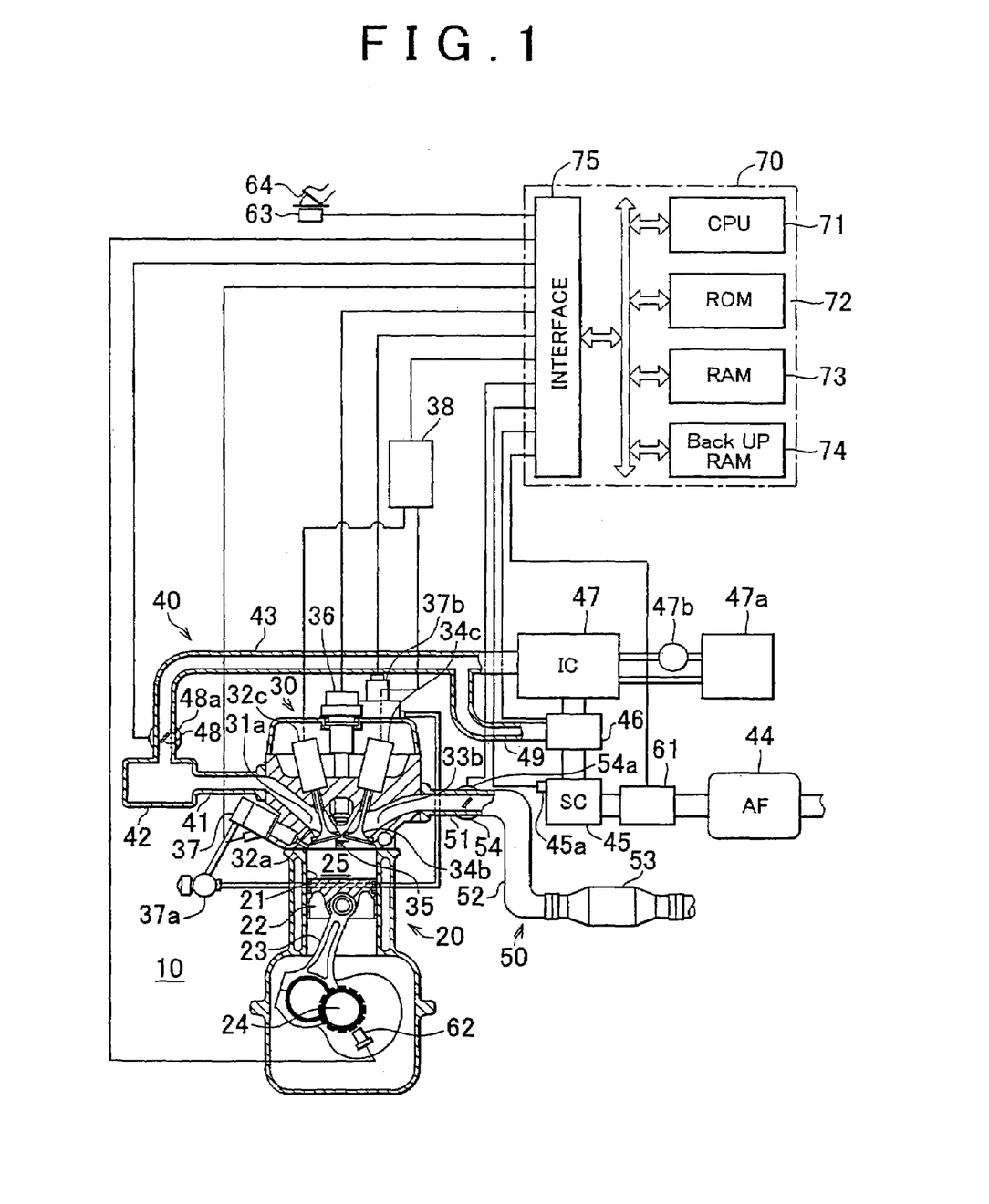
FIG. 1 is a schematic diagram showing the configuration of a system in which a control apparatus according to a first embodiment of the invention is employed for an internal combustion engine that operates in a four-stroke ignition mode.

FIG. 1 shows the schematic configuration of a system in which the control apparatus according to the first embodiment is-employed for the above-described internal combustion engine. Although FIG. 1 shows only the cross section of one cylinder, the other cylinders have the same configuration.

The internal combustion engine (hereinafter, simply referred to as "engine") 10 includes a cylinder block portion 20, a cylinder head portion 30, an intake system 40, and an exhaust system 50. The cylinder block portion 20 includes a cylinder block, a crankcase, and an oil pan. The cylinder head portion 30 is fixed on the cylinder block portion 20. Air is supplied to the cylinder block portion 20 through the intake system 40. Burned gas is discharged from the cylinder block portion 20 to the outside of a vehicle through the exhaust system 50.

The cylinder block portion 20 further includes cylinders 21, pistons 22, connecting rods 23, and a crankshaft 24. The piston 22 reciprocates in the cylinder 21. The reciprocating movement of the piston 22 is transmitted to the crankshaft 24 via the connecting rod 23. As a result, the crankshaft 24 rotates. The cylinder 21, the head of the piston 22, and the cylinder head portion 30 form a substantially columnar combustion chamber 25.

Figure 2:
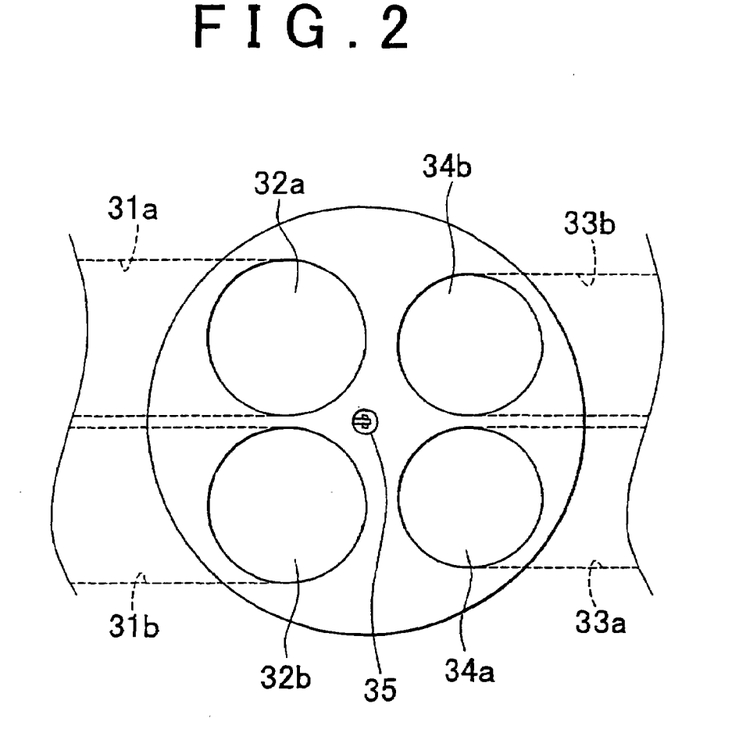
FIG. 2 is a schematic diagram showing the bottom surface of a cylinder head portion of a combustion chamber in FIG. 1, which is viewed from the combustion chamber.

FIG. 2 shows the bottom surface of the cylinder head portion 30 (hereinafter, simply referred to as "cylinder head surface") viewed from the combustion chamber 25. As shown in FIG. 1 and FIG. 2, the cylinder head portion 30 includes two intake ports 31a and 31b; two intake valves 32a and 32b; an electromagnetic intake-valve drive mechanism 32c; two exhaust ports 33a and 33b; two exhaust valves 34a and 34b; an electromagnetic exhaust-valve drive mechanism 34c; an ignition plug 35; igniter 36; an injector (fuel injection valve) 37; an accumulator 37a; and a fuel pump 37b. The intake ports 31a and 31b are connected to the combustion chamber 25. The intake valve 32a and 32b open/close the intake ports 31a and 31b, respectively. The intake-valve drive mechanism 32c, which may be regarded as the intake-valve drive portion, drives the two intake valves 32a and 32b. The exhaust ports 33a and 33b are connected to the combustion chamber 25. The exhaust valves 34a and 34b open/close the exhaust-ports 33a and 33b, respectively. The exhaust-valve drive mechanism 34c, which may be regarded as the exhaust-valve drive portion, drives the two exhaust valves 34a and 34b. The igniter 36, which includes an ignition coil, generates high voltage, and supplies the high voltage to the ignition plug 35. The injector 37 injects fuel into the combustion chamber 25. The accumulator 37a supplies fuel under high pressure to the injector 37. The fuel pump 37b delivers the fuel under pressure to the accumulator 37a. The intake-valve drive mechanism 32c and the exhaust-valve drive mechanism 34c are connected to a drive circuit 38.

As shown in FIG. 2, the intake ports 31a and 31b have respective circular openings. Thus, the two circular openings are formed in the cylinder head surface. When the cylinder head surface is divided into two sections using a plane that includes the central axis of the cylinder 2, the centers of the openings of the intake ports 31a and 31b are positioned in one section of the cylinder head surface.

The exhaust ports 33a and 33b have respective circular openings, like the intake ports 31a and 31b. Thus, two circular openings are formed in the cylinder head surface. The center of the opening of the exhaust port 33a is positioned in the other section of the cylinder head surface. The center of the opening of the exhaust port 33a is also positioned on the straight line that passes through the center of the intake port 31a and the central axis of the cylinder 21. The center of the opening of the exhaust port 33b is positioned in the other section of the cylinder head surface. The center of the opening of the exhaust port 33b is also positioned on the straight line that passes through the center of the intake port 31b and the central axis of the cylinder 21.

With this configuration, the distances between the intake valve 32a and the exhaust valve 34a, and between the intake valve 32b and the exhaust valve 34b are longer than the distances between the intake valve 32a and the exhaust valve 34b, and between the intake valve 32b and the exhaust valve 34a. In other words, the distances between the pair of the intake valve 32a and the exhaust valve 34a, and between the pair of the intake valve 32b and the exhaust valve 34b are longest among the distances between all the pairs of one intake valve and one exhaust valve.

The intake-valve drive mechanism 32c drives the intake valves 32a and 32b in response to drive signals from the drive circuit 38. Thus, each of the intake valves 32a and 32b moves to a predetermined valve-open position or a predetermined valve-closed position in an extremely short period.

Accordingly, the lift of the intake valves 32a and 32b is substantially constant while the intake valves 32a and 32b are open. The lift of the intake valves 32a and 32b changes only in the extremely short period in which the intake valves 32a and 32b move.

The exhaust-valve drive mechanism 34c drive the exhaust valves 34a and 34b in response to drive signals from the drive circuit 38, in the manner similar to the manner in which the intake-valve drive mechanism 32c drives the intake valves 32a and 32b. Thus, each of the exhaust valves 34a and 34b moves to a predetermined valve-open position or a predetermined valve-closed position in an extremely short time. Accordingly, the lift of the exhaust valves 34a and 34b is substantially constant while the exhaust valves 34a and 34b are open. The lift of the exhaust valves 34a and 34b changes only in the extremely short period in which the exhaust valves 34a and 34b move, as in the case of the intake valves 32a and 32b.

As shown in FIG. 1, the intake system 40 includes an intake manifold 41, a surge tank 42, an intake duct 43, an air filter (AF) 44, a mechanical supercharger (SC) 45, a flow-amount adjustment valve 46, an intercooler (IC) 47, a throttle valve 48, and a bypass 49. The intake manifold 41 is connected to the intake port 31. The surge tank 42 is connected to the intake manifold 41. One end of the intake duct 43 is connected to the surge tank 42. The intake manifold 41, the surge tank 42, and the intake duct 43 form an intake passage (intake pipe). The air filter 44, the mechanical supercharger 45, the flow-amount adjustment valve 46, the intercooler 47, the throttle valve 48, and the bypass 49 are provided in the intake duct 43 in the stated order from the other end of the intake duct 43 to the area downstream of the intake duct 43 (i.e., the surge tank 42).

The mechanical supercharger 45 includes a mechanical supercharger clutch 45a. The mechanical supercharger clutch 45a switches the state of the mechanical supercharger 45 between the operating state (supercharging state) and the non-operating state (non-supercharging state), in response to the drive signal. When the mechanical supercharger 45 is in the operating state, the mechanical supercharger 45 is driven by the engine 10. When the mechanical supercharger 45 is in the non-operating state, the mechanical supercharger 45 is not driven by the engine 10.

The intercooler 47 cools air passing through the intake duct 43, using coolant. The intercooler 47 is connected to a radiator 47a and a circulation pump 47b. The radiator 47a releases the heat of coolant in the intercooler 47, into the atmosphere. The circulation pump 47b circulates the coolant between the intercooler 47 and the radiator 47a.

The throttle valve 48 is rotatably supported in the intake duct 43. A throttle-valve actuator 48a drives the throttle valve 48, thereby changing the cross sectional area of the intake passage.

One end of the bypass 49 is connected to the flow-amount adjustment valve 46. The other end of the bypass 49 is connected to the intake duct 43 at the position between the intercooler 47 and the throttle valve 48. The opening amount (not shown) of the flow-amount adjustment valve 46 changes in response to the drive signal. Thus, the flow-amount adjustment valve 46 adjusts the amount of air that flows into the intercooler 47, and the amount of air that bypasses the intercooler 47 (i.e., the amount of air that flows into the bypass 49).

The exhaust system 50 includes an exhaust manifold 51, an exhaust pipe 52, and a three-way catalyst device 53. The exhaust manifold 51 includes a plurality of passages, and a collector box. The passages are independent of each other, and are connected to the exhaust ports 33a and 33b in all the cylinders. The collector box is positioned downstream of the passages. After passing through the passages, burned gas flows into the collector box. The exhaust pipe 52 is positioned downstream of the collector box, and is connected to the exhaust manifold 51. The three-way catalyst device 53 is provided in the exhaust pipe 52. The exhaust ports 33a and 33b, the exhaust manifold 51, and the exhaust pipe 52 constitute an exhaust passage.

The exhaust system 50 further includes a flow-amount adjustment valve 54. The flow-amount adjustment valve 54 is rotatably supported in the exhaust manifold 51 at the collector box of the exhaust manifold 51 (or in the exhaust pipe 52 at the position near the area where the exhaust manifold 51 and the exhaust pipe 52 are connected). An adjustment-valve actuator 54a drives the flow-amount adjustment valve 54, thereby changing the opening amount of the flow-amount adjustment valve 54. This changes the cross sectional area of the exhaust passage where the flow-amount adjustment valve 54 is disposed.

This system includes an airflow meter 61, a crank position sensor 62, an accelerator-pedal operation sensor 63, and an electric control unit 70.

The airflow meter 61 outputs a signal that indicates the amount of air passing through the intake duct 43. The crank position sensor 62 outputs a signal having a narrow pulse-width each time the crankshaft 24 rotates by 5 degrees. However, each time the crankshaft 24 rotates by 360 degrees, the crank position sensor 62 outputs a signal having a wide pulse-width. The output signal of the crank position sensor 62 indicates an engine speed NE. The accelerator-pedal operation sensor 63 outputs a signal that indicates the operation amount of the accelerator pedal 64 (i.e., the accelerator-pedal operation amount Accp).

The electric control unit 70 is a microcomputer that includes a CPU 71, ROM 72, RAM 73, RAM 74, and an interface 75, which are connected to each other by a bus. The ROM 72 stores in advance, for example, programs executed by the CPU 71, tables (look-up tables and maps), and constant numbers. The CPU 71 puts data into the RAM 73 so that the RAM 73 temporarily stores the data, as necessary. When electric power is supplied to the backup RAM 74, the backup RAM 74 stores data. When the supply of electric power to the backup RAM 74 is interrupted, the data in the backup RAM 74 is not lost. The interface 75 includes an AD converter.

The interface 75 is connected to the above-described sensors 61 to 63. The interface 75 supplies signals, which has been transmitted from the sensors 61 to 63, to the CPU 71. The interface 75 also transmits drive signals to the igniter 36, the injector 37, the fuel pump 37b, the drive circuit 38, the mechanical supercharger clutch 45a, the flow-amount adjustment valve 46, the actuators 48a and 54a, according to the instruction provided by the CPU 71.

Next, the operation of the control apparatus having the above-described configuration will be summarized. The control apparatus opens and closes at least one of the exhaust valves 34a and 34b so that at least one of the exhaust valves 34a and 34b is open during a portion of the exhaust stroke. Thus, burned gas in the combustion chamber 25 is discharged. Further, the control apparatus opens and closes at least one of the intake valves 32a and 32b so that at least one of the intake valves 32a and 32b is open during a portion of the intake stroke. Thus, air is introduced into the combustion chamber 25.

In addition, the control apparatus opens both of the exhaust valves 34a and 34b at a second exhaust-valve opening timing EO2. The second exhaust-valve opening timing EO2 is after the timing at which the control apparatus closes the at least one of the exhaust valves 34a and 34b that has been open during the portion of the exhaust stroke. The second exhaust-valve opening timing EO2 is also in the period in which at least one of the intake valves 32a and 32b is open (intake-valve open period). Thus, the burned gas that was discharged from the combustion chamber 25 to the exhaust ports 33a and 33b during the exhaust stroke flows back into the combustion chamber 25 through the exhaust ports 33a and 33b.

Only air is introduced into the combustion chamber 25 in the period from the timing when at least one of the intake valves 32a and 32b is opened until the timing when the exhaust valves 34a and 34b are reopened (i.e., the second exhaust-valve opening timing EO2) during the intake stroke. Thus, as the load on the engine 10 (i.e., the required output) increases, the control apparatus retards the second exhaust-valve opening timing EO2 to increase the amount of air introduced into the combustion chamber 25.

Figure 3:
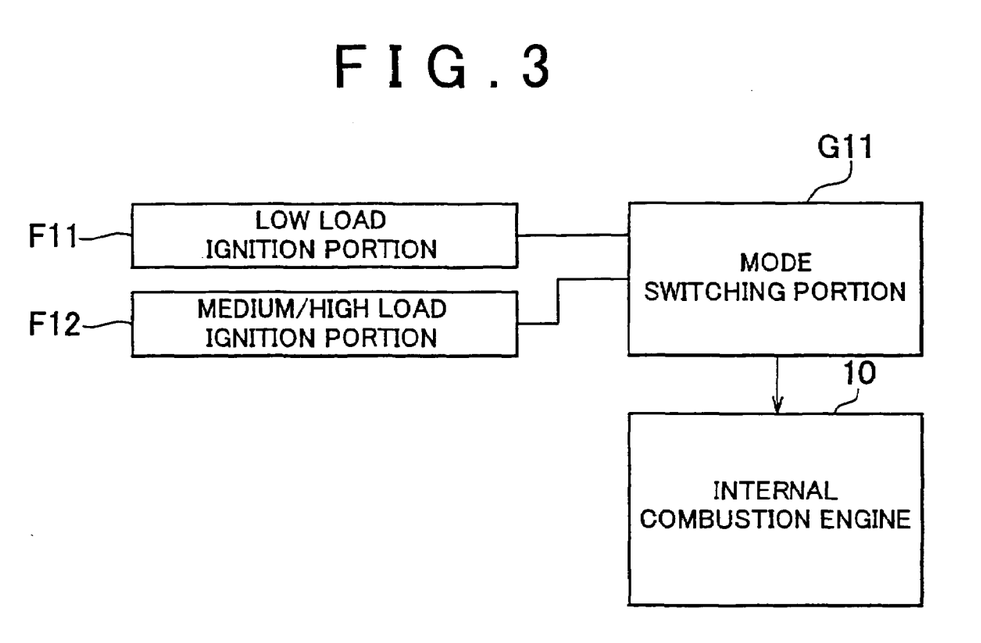
FIG. 3 is a functional block diagram showing a program executed by the CPU of an electric control unit in FIG. 1.

More specifically, the control apparatus includes a low load ignition portion F11, a medium/high-load ignition portion F12, and a mode switching portion G11, as shown in FIG. 3. The functions of these portion are performed when the CPU 71 of the electric control unit 70 executes predetermined programs. Accordingly, hereinafter, the operations executed by the CPU 71 will be described as if the operations were executed by the above-described portions. Each of the low load ignition portion F11 and the medium/high load ignition portion F12 may be regarded as the intake-valve control portion, the first exhaust-valve control portion, the second exhaust-valve control portion, and the adjustment-valve control portion.

Figure 4:
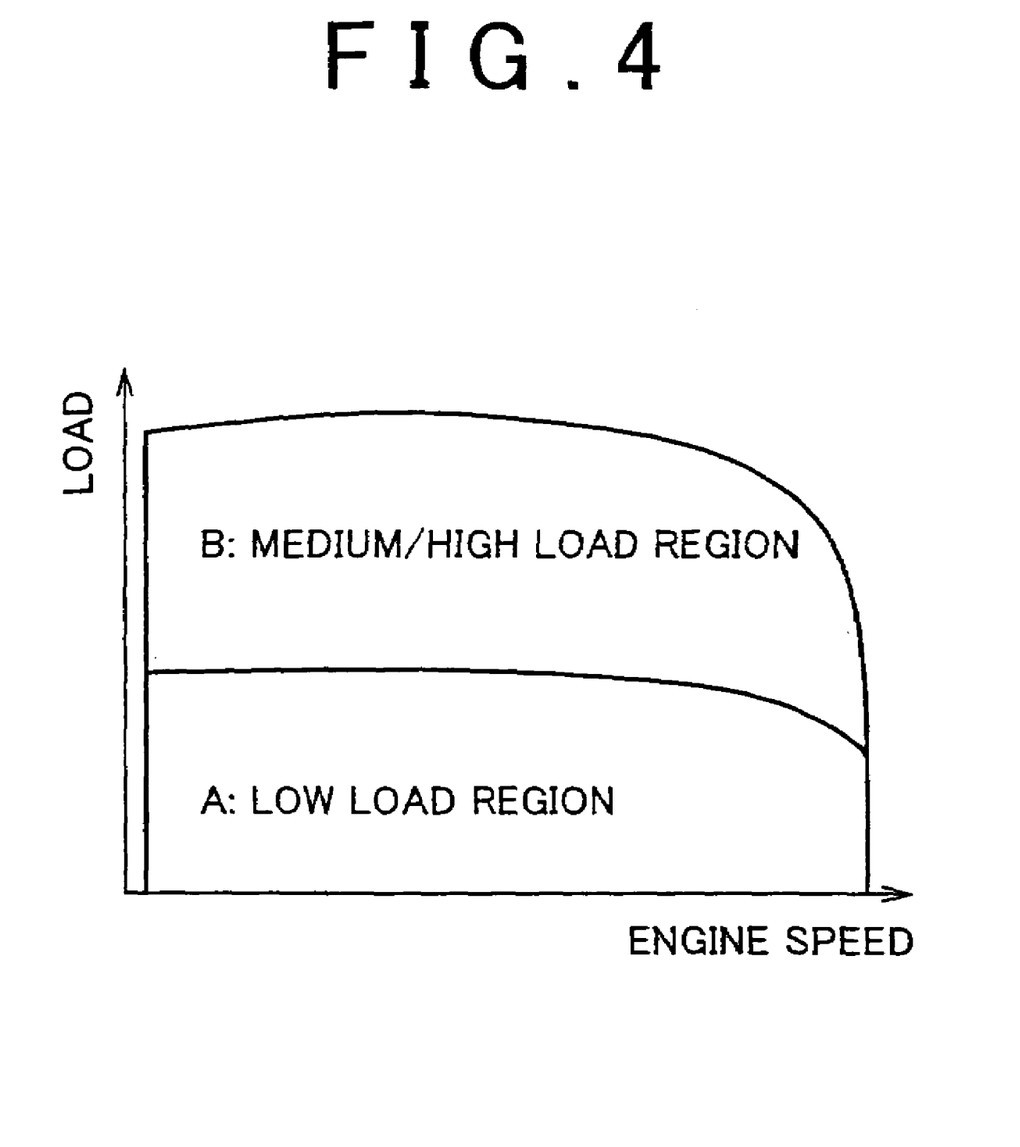
FIG. 4 is a diagram showing an operation region map to which the CPU of the electric control unit in FIG. 1 refers.

The mode switching portion G11 uses an operation region map shown in FIG. 4. The operation region map is stored in the ROM 72 of the electric control unit 70. The operation region map defines the relation between the load on the engine 10 and the engine speed NE, and the operation modes.

In the operation region map, a low load ignition mode and a medium/high load ignition mode are employed as the operation modes. In this map, the low load ignition mode is selected in a low load region A where the load on the engine 10 is below a predetermined threshold value.

The medium/high load ignition mode is selected in a medium/high load region B where the load on the engine 10 is equal to or above the predetermined threshold value.

The mode switching portion G11 determines the operation mode based on the operation region map, the load on the engine 10, and the engine speed NE. Then, the engine 10 operates in the determined operation mode. As the parameter indicating the load on the engine 10, required torque Tqtgt or the accelerator-pedal operation amount Accp may be used. The required torque Tqtgt is determined based on the accelerator-pedal operation amount Accp and the engine speed NE.

When the condition of the engine 10 is operating in the low load region A, the mode switching portion G11 selects the low load ignition portion F11 based on the operation region map. Thus, the low load ignition portion F11 operates the engine 10.

The low load ignition portion F11 controls the flow-amount adjustment valve 54 by driving the adjustment-valve actuator 54a so that the opening amount of the flow-amount adjustment valve 54 decreases as the load on the engine 10 decreases. Further, the low load ignition portion F11 operates the engine 10 by activating the intake-valve drive mechanism 32c, the exhaust-valve drive mechanism 34c, and the injector 37 at predetermined timings, as shown in FIG. 5.

Figure 5:
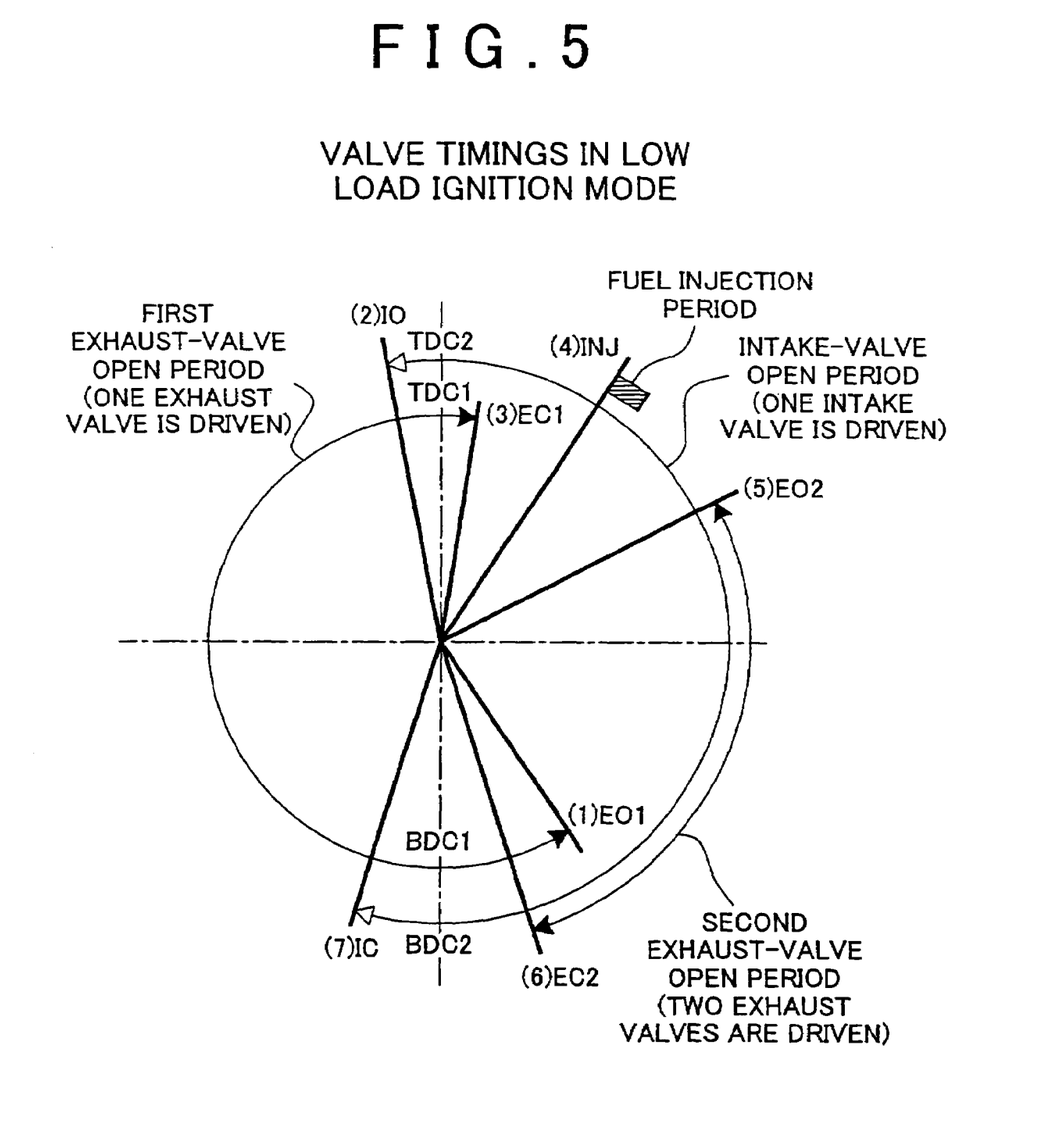
FIG. 5 is an explanatory diagram conceptually showing the opening/closing timings of an intake valve and exhaust valves in a certain cylinder when the internal combustion engine in FIG. 1 operates in a low load ignition mode.

More specifically, the low load ignition portion F11 opens only one exhaust valve 34a or 34b by driving the exhaust-valve drive mechanism 34c at a first exhaust-valve opening timing EO1 in the low load ignition mode (refer to (1) EO1 in FIG. 5). Thus, the burned gas generated by combustion in the previous combustion cycle, is discharged through the exhaust port 33a or 33b (that is, the process of discharging burned gas starts). The first exhaust-valve opening timing EO1 is immediately before the end of the expansion stroke (i.e., immediately before the expansion BDC1). Based on the load on the engine 10, the first exhaust-valve opening timing EO1 is set.

Then, the low load ignition portion F11 opens only one intake valve 32a or 32b by driving the intake-valve drive mechanism 32c at an intake-valve opening timing IO in the low load ignition mode (refer to (2) IO in FIG. 5). Thus, air is introduced into the combustion chamber 25 (that is, the process of introducing air starts). The intake-valve opening timing IO is immediately before the end of the exhaust stroke (i.e., immediately before the exhaust TDC1). Based on the load on the engine 10, the intake-valve opening timing IO is set.

Then, the open intake valve 32a (or 32b) and the open exhaust valve 34a (or 34b) remain open until a first exhaust-valve closing timing EC1 (described later) in the low load ignition mode. The path between the pair of the intake valve 32a and the exhaust valve 34a (or the path between the pair of the intake valve 32b and the exhaust valve 34b) is longest among the paths between all the pairs of one intake valve and one exhaust valve. That is, the path between the opening of the intake port 31a and the opening of the exhaust port 33a (or the path between the opening of the intake port 31b and the opening of exhaust port 33b) is longest. This reduces the possibility that air flows out through the exhaust port 33a from the combustion chamber 25 immediately after flowing into the combustion chamber 25 through the intake port 31a (i.e., the "blow-by" phenomenon occurs) when both of the intake valve 32a and the exhaust valve 34a are open. As a result, it is possible to prevent a decrease in the temperature of the burned gas in the exhaust port 33a due to the blow-by phenomenon.

Then, the low load ignition portion F11 closes the exhaust valve 34a (or 34b), by driving the exhaust-valve drive mechanism 34c, at the first exhaust-valve closing timing EC1 in the low load ignition mode (refer to (3) EC1 in FIG. 5). Thus, the process of discharging burned gas ends. The first exhaust-valve closing timing EC1 is retarded with respect to the intake-valve opening timing IO, and near the exhaust TDC1 (in this embodiment, immediately after the exhaust TDC1). Based on the load on the engine 10, the first exhaust-valve closing timing EC1 is set. In this specification, the period from the first exhaust-valve opening timing EO1 until the first exhaust-valve closing timing EC1 is referred to as "first exhaust-valve open period". The first exhaust-valve closing timing EC1 is set such that substantially all of the burned gas in the combustion chamber 25 is discharged through the exhaust port 33a (or 33b) when the exhaust valve is first closed [clearly the time at which the exhaust valve first closes is dependent on the first exhaust-valve closing timing EC1, I think describing the actual event rather than referring to an abstract timing is more easily understood.].

Then, the low load ignition portion F11 opens the injector 37 to inject fuel at a injection start timing INJ in the low load ignition mode (refer to (4) INJ in FIG. 5). Based on the load on the engine 10 and the engine speed NE, the amount of fuel injected at the timing INJ is set such that the air-fuel ratio of the resulting fuel-air charge in the combustion chamber 25 is extremely lean.

Figure 6A:
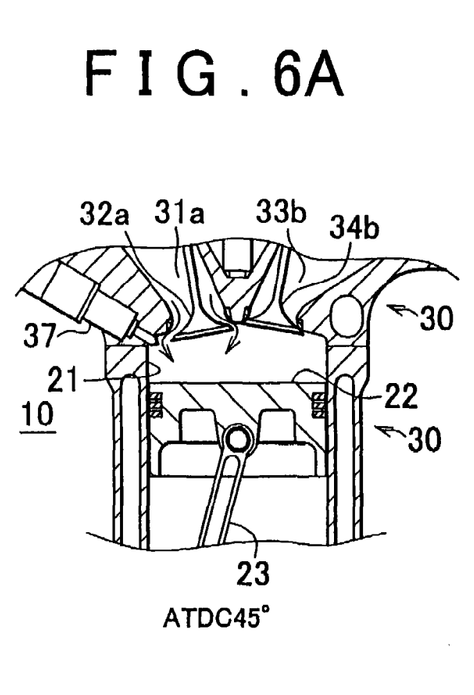
FIGS. 6A to 6C are diagrams schematically showing the changes in the flow of air and burned gas introduced into the combustion chamber.

Then, only air is introduced into the combustion chamber 25 until a second exhaust-valve opening timing EO2 (described later) in the low load ignition mode (for example, refer to FIG. 6A that shows the condition of the engine 10 at 45 degrees ATDC). The fuel injected into the combustion chamber 25 is diffused by the flow of air. In this specification, the crank angle (degree ATDC) signifies the crank angle with respect to the exhaust TDC1. As the crankshaft 24 rotates, the crank angle (degree ATDC), which is a positive value, increases.

Then, the low load ignition portion F11 opens the exhaust valves 34a and 34b by driving the exhaust-valve drive mechanism 34c at the second exhaust-valve opening timing EO2 in the low load ignition mode (refer to (5) EO2 in FIG. 5). Thus, the burned gas that has accumulated in the exhaust ports 33a and 33b, is reintroduced into the combustion chamber 25. The second exhaust-valve opening timing EO2 is retarded with respect to the first exhaust-valve closing timing EC1, and advanced with respect to the intake BDC2. Based on the load on the engine 10, the second exhaust-valve opening timing EO2 is set.

Figure 6B:
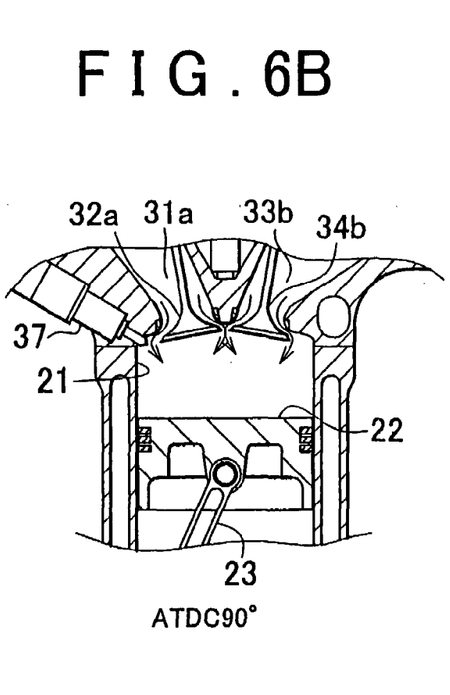

The burned gas continues to flow into the combustion chamber 25 until a second exhaust-valve closing timing EC2 (described later) in the low load ignition mode (for example, refer to FIG. 6B that shows the condition of the engine 10 at 90 degrees ATDC).

Then, the low load ignition portion F11 closes the exhaust valves 34a and 34b at the second exhaust-valve closing timing EC2 in the low load ignition mode (refer to (6) EC2 in FIG. 5). Thus, the process of reintroducing the burned gas ends. The second exhaust-valve closing timing EC2 is advanced with respect to the intake BDC2. Based on the load on the engine 10, the second exhaust-valve closing timing EC2 is set. In this specification, the period from the second exhaust-valve opening timing EO2 until the second exhaust-valve closing timing EC2 is referred to as "second exhaust-valve open period".

Thus, both of the exhaust valves 34a and 34b are open in the second exhaust-valve open period. This reduces the resistance against the reintroduction of the burned gas into the combustion chamber 25, as compared to when only one exhaust valve 34a or 34b is open. This also reduces the pumping loss caused by the reintroduction of the burned gas into the combustion chamber 25. Thus, the fuel efficiency is improved.

Further, as described above, the opening amount of the flow-amount adjustment valve 54 has been decreased. Thus, the burned gas in the exhaust ports 33a and 33b is unlikely to flow out to the area downstream of the flow-amount adjustment valve 54. Therefore, the pressure of the burned gas near the exhaust ports 33a and 33b is high. Accordingly, a sufficient amount of burned gas is introduced into the combustion chamber 25 in the second exhaust-valve open period. As a result, the temperature of the fuel-air charge is reliably increased. Therefore, when the load on the engine 10 is low (i.e., the required output is low), the fuel-air charge reliably autoignites.

Figure 6C:
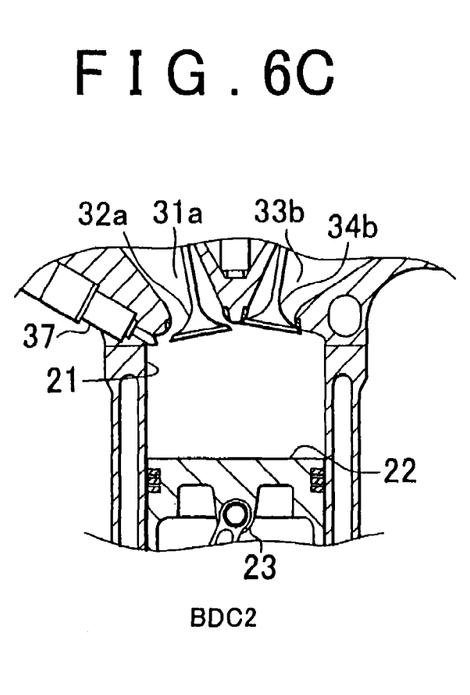

The open intake valve 32a (or 32b) is closed at the intake-valve closing timing IC (described later) in the low load ignition mode (for example, refer to FIG. 6C that shows the condition of the engine 10 at the intake BDC2).

Then, the low load ignition portion F11 closes the intake valve 32a (or 32b) by driving the intake-valve drive mechanism 32c at the intake-valve closing timing IC in the low load ignition mode (refer to (7) IC in FIG. 5). Thus, the process of introducing air into the combustion chamber 25 ends, and the process of compressing the fuel-air charge generated in the combustion chamber 25 starts. The intake-valve closing timing IC is retarded with respect to the second exhaust-valve closing timing EC2, and near the intake BDC2 (immediately after the intake BDC2 in this embodiment). Based on the load on the engine 10, the intake-valve closing timing IC is set. In this specification, the period from the intake-valve opening timing IO until the intake-valve closing timing IC is referred to as "intake-valve open period".

Thus, only one intake valve 32a (or 32b) is open in the intake-valve open period. This increases the flow speed of the air that flows into the combustion chamber 25 from the intake port 31a (or 31b), as compared to when both of the intake valves 32a and 32b are open. Accordingly, the fuel-air charge and the burned gas are strongly stirred by the air flowing into the combustion chamber 25. This promotes the transmission of the heat from the burned gas to the fuel-air charge. Thus, the temperature of the fuel-air charge is reliably increased.

As the piston 22 approaches the compression TDC2, the fuel-air charge generated in the combustion chamber 25 is greatly compressed, and the temperature of the fuel-air charge increases. When the piston 22 reaches the position near the compression TDC2, the temperature of the fuel-air charge reaches an ignition temperature (i.e., the temperature at which the fuel-air charge autoignites and the combustion starts). The autoignition temperature may be, for example, 1000K. Thus, the fuel-air charge autoignites and burns.

Then, the fuel-air charge starts to expand due to combustion after fuel-air charge autoignites. Thus, the engine 10 operates in the ignition mode, when the condition of the engine 10 is in the low load region A.

Further, the low load ignition portion F11 alternates the intake valve that is driven (opened and closed) at the intake-valve opening timing IO and the intake-valve closing timing IC, between the intake valves 32a and 32b each time the combustion cycle has been performed. The low load ignition portion F11 alternates the exhaust valve that is driven (opened and closed) at the first exhaust-valve opening timing EO1 and the first exhaust-valve closing timing EC1, between the exhaust valves 34a and 34b each time the combustion cycle has been performed. That is, after the low load ignition portion F11 opens and closes the pair of the intake valve 32a and the exhaust valve 34a in one combustion cycle, the low load ignition portion F11 opens and closes the pair of the intake valve 32b and the exhaust valve 34b in the next combustion cycle. Further, after the low load ignition portion F11 opens and closes the pair of the intake valve 32b and the exhaust valve 34b in one combustion cycle, the low load ignition portion F11 opens and closes the pair of the intake valve 32a and the exhaust valve 34a in the next combustion cycle.

This avoids the situation where only one of the intake valves 32a and 32b is intensively worn, only one of the exhaust valves 34a and 34b is intensively worn, only one of the members (for example, valve seats) that contact the intake valves 32a and 32b is intensively worn, only one of the members (for example, valve seats) that contact the exhaust valves 34a and 34b is intensively worn, only one side of the member (i.e., the intake-valve drive mechanism 32c) that drives the intake valves 32a and 32b is intensively worn, or only one side of the member (i.e., the exhaust-valve drive mechanism 34c) that drives the exhaust valves 34a and 34b is intensively worn. This improves the durability of the intake valves 32a and 32b, the exhaust valves 34a and 34b, and the above-described members. This improves the durability of the intake valves 32a and 32b, the exhaust valves 34a and 34b, and the above-described members.

When the condition of the engine 10 is in the medium/ high load region B (that is, when the engine 10 needs to operate in the medium/high load ignition mode), the mode switching portion G11 selects the medium/high load ignition portion F12 based on the operation region map. Thus, the medium/high load ignition portion F12 operates the engine 10.

The medium/high load ignition portion F12 is the same as the low load ignition portion F12, except that the medium/ high load ignition portion F12 completely opens the flow-amount adjustment valve 54, opens both of the intake valves 32a and 32b in the intake-valve open period, opens both of the exhaust valves 34a and 34b in the first exhaust-valve open period, and retards the second exhaust-valve open period with respect to the second exhaust-valve open period in the low load ignition mode. Accordingly, hereinafter, the description will focus on the above differences.

The medium/high load ignition portion F12 controls the flow-amount adjustment valve 54 so that the flow-amount adjustment valve 54 is completely opened by driving the adjustment-valve actuator 54a. This reduces the resistance against the burned gas passing through the exhaust passage. As a result, fuel efficiency is improved.

Figure 7:
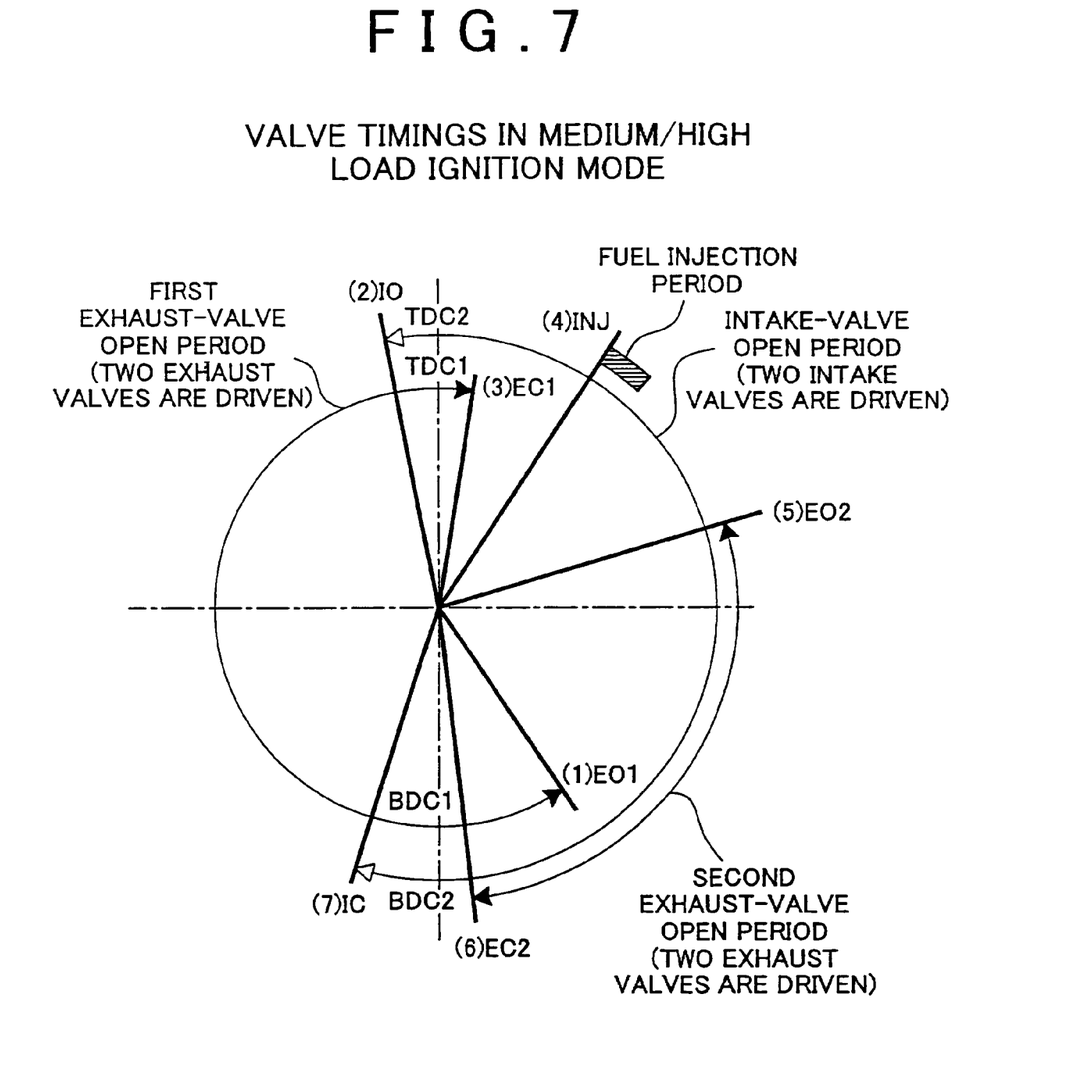
FIG. 7 is an explanatory diagram conceptually showing the opening/closing timings of the intake valves and the exhaust valves in a certain cylinder when the internal combustion engine in FIG. 1 operates in a medium/high load ignition mode.

Further, the medium/high load ignition portion F12 operates the engine 10 by activating the intake-valve drive mechanism 32c, the exhaust-valve drive mechanism 34c, and the injector 37 at predetermined timings, as shown in FIG. 7.

More specifically, the medium/high load ignition portion F12 opens both of the exhaust valves 34a and 34b by driving the exhaust-valve drive mechanism 34c at the first exhaust-valve opening timing EO1 in the medium/high load ignition mode (refer to (1) EO1 in FIG. 7). Thus, the burned gas, which has been generated by the combustion in the previous combustion cycle, is discharged through the exhaust ports 33a and 33b. The first exhaust-valve opening timing EO1 is substantially the same as the timing EO1 in the low load ignition mode. That is, the first exhaust-valve opening timing EO1 is immediately before the expansion BDC1. Based on the load on the engine 10, the first exhaust-valve opening timing EO1 is set.

As the load on the engine 10 increases, the amount of burned gas generated by combustion increases. This increases the amount of burned gas, which needs to be discharged during the first exhaust-valve open period. Therefore, if only one exhaust valve 34a or 34b is opened, the back pressure (i.e., the resistance against the discharge of the burned gas from the combustion chamber 25) may excessively increase. Accordingly, as described above, when the engine 10 operates in the medium/high load ignition mode, both of the exhaust valves 34a and 34b are opened. This prevents an excessive increase in the back pressure.

Then, the medium/high load ignition portion F12 opens both of the intake valves 32a and 32b by driving the intake-valve drive mechanism 32c at the intake-valve opening timing IO in the medium/high load ignition mode (refer to (2) IO in FIG. 7). Thus, air is introduced into the combustion chamber 25. The intake-valve opening timing IO is substantially the same as the timing IO in the low load ignition mode. That is, the intake-valve opening timing IO is immediately before the exhaust TDC1. Based on the load on the engine 10, the intake-valve opening timing IO is set.

Then, the medium/high load ignition portion F12 closes the exhaust valves 34a and 34b at the first exhaust-valve closing timing EC1 in the medium/high load ignition mode (refer to (3) EC1 in FIG. 7). The first exhaust-valve closing timing EC1 is substantially the same as the timing EC1 in the low load ignition mode. That is, the first exhaust-valve closing timing EC1 is immediately after the exhaust TDC1. Based on the load on the engine 10, the first exhaust-valve closing timing EC1 is set. Then, the injector 37 injects fuel at the injection start timing INJ in the medium/high load ignition mode (refer to (4) INJ in FIG. 7). Based on the load on the engine 10, the injection start timing INJ is set.

The medium/high load ignition portion F12 opens the exhaust valves 34a and 34b at the second exhaust-valve opening timing EO2 in the medium/high load ignition mode, by driving the exhaust-valve drive mechanism 34c (refer to (5) EO2 in FIG. 7). Thus, the burned gas, which has been discharged through the exhaust ports 33a and 33b in the first exhaust-valve open period, is reintroduced into the combustion chamber 25 again. The second exhaust-valve opening timing EO2 is retarded with respect to the timing EO2 in the low load ignition mode, and advanced with respect to the intake BDC2.

Figure 8A:
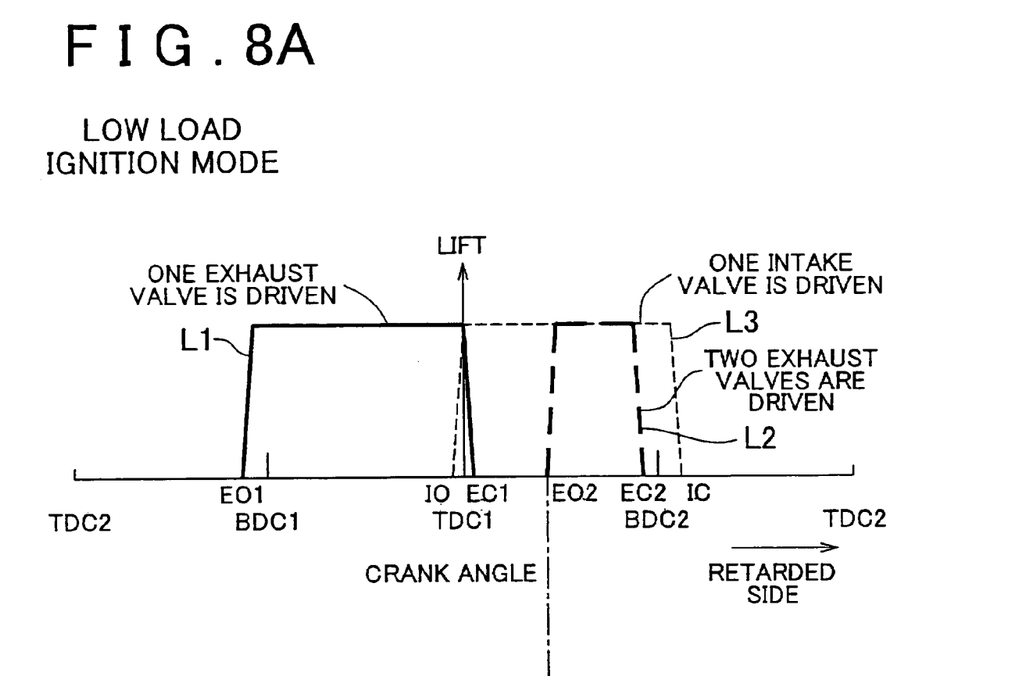
FIGS. 8A and 8B are diagrams schematically showing the changes in the lifts of the intake valves and the exhaust valves with respect to the crank angle in the low load ignition mode and in the medium/high load ignition mode in the first embodiment of the invention.
Figure 8B:
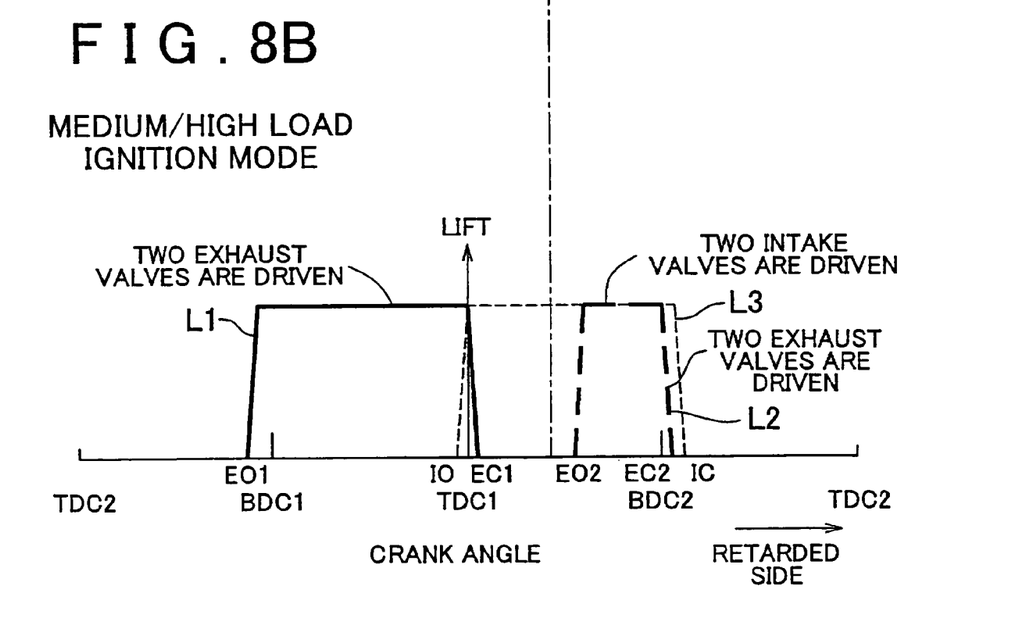

FIG. 8A shows the changes in the lift of the intake valve 32a or 32b, and the lift of the exhaust valves 34a and 34b with respect to the crank angle in the low load ignition mode. FIG. 8B shows the changes in the lift of the intake valves 32a and 32b, and the lift of the exhaust valves 34a and 34b with respect to the crank angle in the medium/high load ignition mode. In FIGS. 8A and 8B, the solid line L1 indicates the change in the lift of the exhaust valve(s) 34a or/and 34b in the first exhaust-valve open period. The dashed line L2 indicates the change in the lift of the exhaust valves 34a and 34b in the second exhaust-valve open period. The dotted line L3 indicates the change in the lift of the intake valve(s) 32a or/and 32b in the intake-valve open period.

As shown in FIGS. 8A and 8B, in the medium/high load ignition mode, the second exhaust-valve open timing EO2 (i.e., the timing at which the second exhaust-valve open period starts) is retarded with respect to the timing EO2 in the low load ignition mode. Accordingly, in the medium/ high load ignition mode, the period in which only air is introduced into the combustion chamber 25 prior to the introduction of the combustion air (i.e., the period from the intake-valve opening timing IO (that is substantially the same as the exhaust TDC1) until the second exhaust-valve opening timing EO2) is longer than that in the low load ignition mode. Thus, in the medium/high load ignition mode, the amount of air introduced into the combustion chamber 25 in the above-described period is greater than that in the low load ignition mode.

As a result, when the load on the engine 10 increases, as much air as required for combustion can be supplied into the combustion chamber 25. This obviates the need to decrease the lift of the exhaust valves 34a and 34b to an extremely small value (i.e., the need to decrease a clearance between the exhaust valve 34a and the exhaust port 33a and a clearance between the exhaust valve 34b and the exhaust port 33b) to decrease the amount of burned gas introduced into the combustion chamber 25. Thus, the engine 10 operates with high fuel-efficiency.

Then, the exhaust valves 34a and 34b are closed at the second exhaust-valve closing timing EC2 in the medium/ high load ignition mode (refer to (6) EC2 in FIG. 7). The second exhaust-valve closing timing EC2 is retarded with respect to the timing EC2 in the low load ignition mode. Based on the load on the engine 10, the second exhaust-valve closing timing EC2 is set. Then, the intake valves 32a and 32b are closed at the intake-valve closing timing IC in the medium/high load ignition mode (refer to (7) IC in FIG. 7). When the piston 22 reaches the position near the compression TDC, the temperature of the fuel-air charge reaches the autoignition temperature, and the fuel-air charge autoignites and burns. Then, the fuel-air charge starts to expand due to combustion after the fuel-air charge autoignites. Thus, the engine 10 operates in the ignition mode when the condition of the engine 10 is in the medium/high load region B.

As described above, in the medium/high load ignition mode, the control apparatus for the internal combustion engine in the first embodiment of the invention retards the second exhaust-valve opening timing EO2 with respect to the timing EO2 in the low load ignition mode. As a result, when the load on the engine 10 increases, the engine 10 operates with high fuel efficiency.

Next, a control apparatus for an internal combustion engine according to a second embodiment of the invention will be described. An engine 10A in the second embodiment differs from the engine 10 in the first embodiment, only in that the intake-valve drive mechanism and exhaust-valve drive mechanism of the engine 10A are mechanical. Hereinafter, the description will focus on the differences.

The internal combustion engine 10A includes the mechanical intake-valve drive mechanism, instead of the electromagnetic intake-valve drive mechanism 32c as in the first embodiment. The intake-valve drive mechanism is a variable timing cam mechanism that includes a known variable timing mechanism. The variable timing mechanism opens and closes the intake valves 32a and 32b at variable timings using a drive shaft (camshaft) that rotates due to the rotation of the crankshaft 24.

When the cam mechanism drives the intake valves 32a and 32b, if the cams do not smoothly rotate, the friction between the cams and the intake valves 32a and 32b may result in significant pumping loss, and extremely loud noise may be caused due to the impact between the cams and the intake valves 32a and 32b. Therefore, each cam is formed such that the cam nose does not have an extremely great curvature in the cam profile. Accordingly, in the case where this mechanical intake-valve drive mechanism is used, the lift of the intake valves 32a and 32b gradually changes in the period in which the intake valves 32a and 32b are open, unlike the case where the electromagnetic intake-valve drive mechanism 32c is used.

Further, a known operation stop mechanism, which temporarily stops the operation of one intake valve 32a or 32b, is incorporated in the intake-valve drive mechanism (for example, refer to Japanese Patent Application Publication No. JP-A-2005-36660).

The engine 10A also includes the mechanical exhaust-valve drive mechanism, instead of the electromagnetic exhaust-valve drive mechanism 34c in the first embodiment. The mechanical exhaust-valve drive mechanism is a variable timing cam mechanism in which the operation stop mechanism is incorporated, like the mechanical intake-valve drive mechanism. Accordingly, in the case where this mechanical intake-valve drive mechanism is used, the lift of the exhaust valves 34a and 34b gradually changes in the period in which the exhaust valves 34a and 34b are open, unlike the case where the electromagnetic exhaust-valve drive mechanism 32c is used.

Figure 9A:
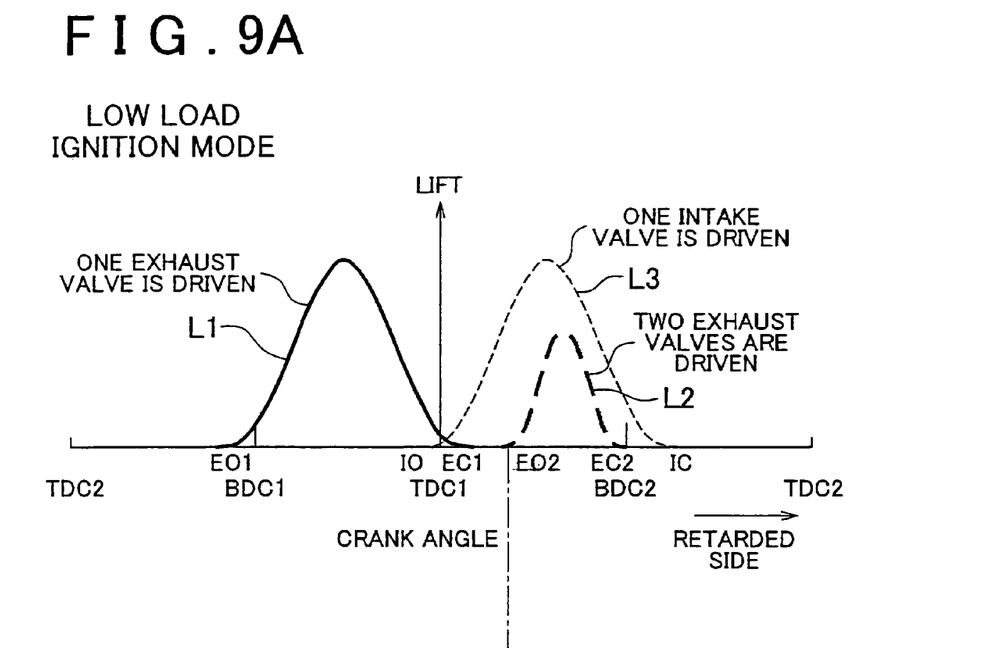
FIGS. 9A and 9B are diagrams schematically showing the changes in the lifts of the intake valves and the exhaust valves with respect to the crank angle in the low load ignition mode and in the medium/high load ignition mode in the second embodiment of the invention.
Figure 9B:
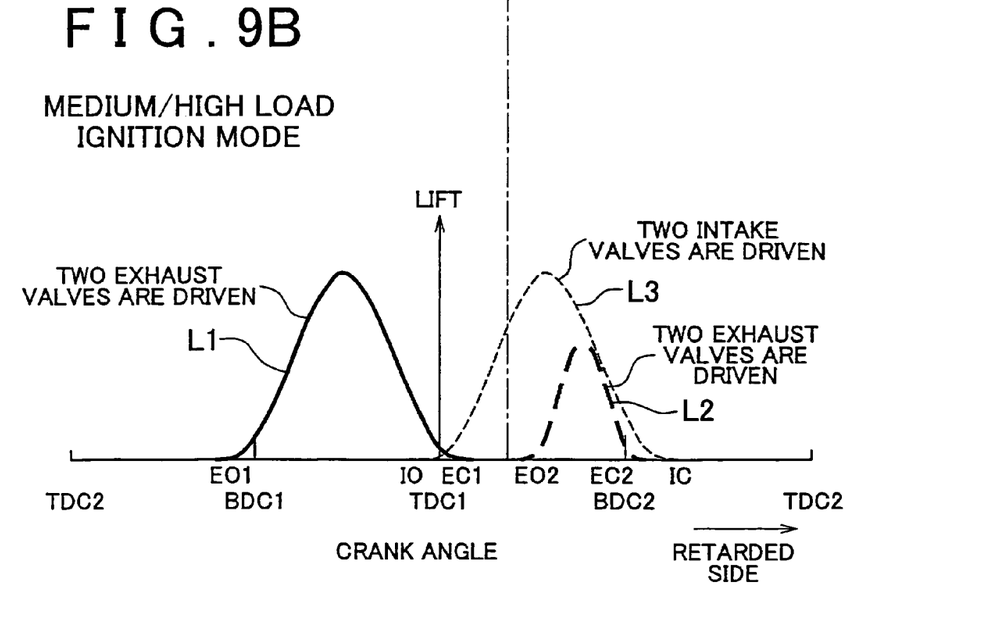

With this configuration, the control apparatus for the engine 10A in the second embodiment drives the intake valves 32a and 32b and the exhaust valves 34a and 34b at the timings similar to the timings in the first embodiment, as shown in FIGS. 9A and 9B. FIG. 9A shows the changes in the lift of the intake valve 32a or 32b and the lift of the exhaust valves 34a and 34b with respect to the crank angle in the low load ignition mode. FIG. 9B shows the changes in the lift of the intake valves 32a and 32b and the lift of the exhaust valves 34a and 34b with respect to the crank angle in the medium/high load ignition mode. In FIGS. 9A and 9B, the solid line L1 indicates the change in the lift of the exhaust valve(s) 34a or/and 34b in the first exhaust-valve open period. The dashed line L2 indicates the change in the lift of the exhaust valves 34a and 34b in the second exhaust-valve open period. The dotted line L3 indicates the change in the lift of the intake valve(s) 32a or/and 32b in the intake-valve open period.

As described above, the friction between the cams and the exhaust valves 34a and 34b may cause significant pumping loss, and extremely loud noise may be caused due to the impact between the cams and the exhaust valves 34a and 34b. Therefore, each cam is formed such that the cam nose does not have an extremely great curvature in the cam profile. Accordingly, as the exhaust-valve open period decreases, the lift of the exhaust valves 34a and 34b decreases. That is, as shown in FIGS. 9A and 9B, the lift in the first exhaust-valve open period (i.e., the period from EO1 until EC1) is smaller than the lift in the second exhaust-valve open period (i.e., the period from EO2 until EC2).

Hereinafter, the actual operation of the control apparatus will be described more specifically. The low load ignition portion F11 controls the operation stop mechanism of the intake-valve drive mechanism to stop the operation of one of the intake valves 32a and 32b at the intake-valve opening timing IO and the intake-valve closing timing IC. Thus, the cam mechanism of the intake-valve drive mechanism drives only the other of the intake valves 32a and 32b.

Further, the low load ignition portion F11 controls the operation stop mechanism of the exhaust-valve drive mechanism to stop the operation of one of the exhaust valves 34a and 34b at the first exhaust-valve opening timing EO1 and the first exhaust-valve closing timing EC1. Thus, the cam mechanism of the exhaust-valve drive mechanism drives only the other of-the exhaust valves 34a and 34b.

The medium/high load ignition portion F12 controls the operation stop mechanism of the intake-valve drive mechanism to allow both of the intake valves 32a and 32b to operate at the intake-valve opening timing IO and the intake-valve closing timing IC. Thus, the cam mechanism of the intake-valve drive mechanism drives both of the intake valves 32a and 32b.

Further, the medium/high load ignition portion F12 controls the operation stop mechanism of the exhaust-valve drive mechanism to allow both of the exhaust valves 34a and 34b to operate at the first exhaust-valve opening timing EO1 and the first exhaust-valve closing timing EC1. Thus, the cam mechanism of the exhaust-valve drive mechanism drives both of the exhaust valves 34a and 34b.

In addition, the medium/high load ignition portion F12 retards the second exhaust-valve opening timing EO2 and the second exhaust-valve closing timing EC2 with respect to the timings EO2 and EC2 in the low load ignition mode, by controlling the variable timing mechanism of the exhaust-valve drive mechanism, as shown in FIG. 9. Thus, as in the first embodiment, when the engine 10A operates in the medium/high load ignition mode, a great amount of air is supplied to the combustion chamber 25 during the period in which only air is introduced in the combustion chamber 25 before the introduction of the burned gas (i.e., the period from the intake-valve opening timing IO until the second exhaust-valve opening timing EO2 during the intake stroke), as compared to when the engine 10A operates in the low load ignition mode.

As a result, when the load on the engine 10A increases, as much air as required for combustion can be supplied to the combustion chamber 25. This obviates the need to decrease the lift of the exhaust valves 34a and 34b to an extremely small value (i.e., the need to decrease a clearance between the exhaust valve 34a and the exhaust port 33a and a clearance between the exhaust valve 34b and the exhaust port 33b) to decrease to decrease the amount of burned gas introduced into the combustion chamber 25.

As described above, in the medium/high load ignition mode, the control apparatus for the engine 10A in the second embodiment of the invention retards the second exhaust-valve opening timing EO2 with respect to the timing EO2 in the low load ignition mode, as in the first embodiment. As a result, when the load on the engine 10A increases, the engine 10A operates with high fuel efficiency.

In the second embodiment, intake-port control valves (airflow control valves) may be provided in the intake ports 31a and 31b. When the intake-port control valves are completely opened/closed, the intake ports 31a and 31b are opened/closed. In this case, in the low load ignition mode, the control apparatus drives (opens and closes) both of the intake valves 32a and 32b at the intake-valve opening timing IO and the intake-valve closing timing IC. The control apparatus also completely opens one of the intake-port control valves, and completely closes the other.

Thus, air flows into the combustion chamber 25 through only one intake port 31a or 31b during the intake-valve open period, obviating the need to stop the operation of one intake valve 32a or 32b. This increases the flow speed of the air flowing into the combustion chamber 25. Accordingly, the control apparatus does not need to include the operation stop mechanism that stops the operation of one intake valve 32a or 32b.

The invention is not limited to the above-described embodiments. Various modifications may be made in the scope of the invention. For example, in each of the above-described embodiments, the engine 10 may operate in a spark ignition mode when the condition of the engine 10 is in a high load region within the medium/high load region B.

Although the flow-amount adjustment valve 54 is disposed at the collector box of the exhaust manifold 51 in each of the above-described embodiments, the flow-amount adjustment valve 54 may be disposed at each of the exhaust ports 33a and 33b. In this case, the volume of the exhaust passage between the flow-amount adjustment valve 54 to each of the exhaust valves 34a and 34b is reduced. This reduces the time lag between the change in the opening amount of the flow-amount adjustment valve 54 and the change in the pressure of the burned gas in the exhaust passage. As a result, when the load on the engine 10 sharply changes, the amount of burned gas introduced into the combustion chamber 25 is appropriately adjusted.

What is claimed is:

1. A control apparatus for a four-stroke premixed compression ignition internal combustion engine, the control apparatus comprising:
   an intake-valve control portion that opens an intake valve at an intake-valve opening timing so that the intake valve is open during at least a portion of an intake stroke, and that closes the intake valve at an intake-valve closing timing; and
   an exhaust-valve control portion that includes a first exhaust-valve control portion and a second exhaust-control portion,
   wherein:
   the first exhaust-valve control portion opens an exhaust valve at a first exhaust-valve opening timing so that the exhaust valve is open during a portion of an exhaust stroke, and the first exhaust-valve control portion closes the exhaust valve, at a first exhaust-valve closing timing that is near an exhaust top dead center;
   the second exhaust-valve control portion opens the exhaust valve at a second exhaust-valve opening timing that is retarded with respect to the first exhaust-valve closing timing and the intake-valve opening timing, and is advanced with respect to the intake-valve closing timing, and the second exhaust-valve control portion closes the exhaust valve, at a second exhaust-valve closing timing, and
   the second exhaust-valve control portion retards the second exhaust-valve opening timing when a load on the internal combustion engine increases.

2. The control apparatus for the four-stroke premixed compression ignition internal combustion engine according to claim 1, wherein
   the internal combustion engine includes at least two intake valves; and
   the intake-valve control portion opens and closes only one of the at least two intake valves when the load on the internal combustion engine is below a predetermined threshold value.

3. The control apparatus for the four-stroke premixed compression ignition internal combustion engine according to claim 2, wherein
   the internal combustion engine includes at least two exhaust valves;
   the first exhaust-valve control portion opens and closes one of the at least two exhaust valves, and retards the first exhaust-valve closing timing with respect to the intake-valve opening timing when the load on the internal combustion engine is below the predetermined threshold value; and
   the intake-valve control portion and the first exhaust-valve control portion select a pair of the intake valve and the exhaust valve, a distance between which is longest among distances between all pairs of the intake valve and the exhaust valve, as the pair of the intake valve and the exhaust valve to be opened and closed, when the load on the internal combustion engine is below the predetermined threshold value.

4. The control apparatus for the four-stroke premixed compression ignition internal combustion engine according to claim 3, wherein
   the intake-valve control portion alternately opens and closes the at least two intake valves each time a predetermined period has elapsed, when the load on the internal combustion engine is below the predetermined threshold value; and
   the first exhaust-valve control portion alternately opens and closes the at least two exhaust valves each time the predetermined period has elapsed, when the load on the internal combustion engine is below the predetermined threshold value.

5. The control apparatus for the four-stroke premixed compression ignition internal combustion engine according to claim 3, wherein the second exhaust-valve control portion opens and closes both of the at least two exhaust valves.

6. The control apparatus for the four-stroke premixed compression ignition internal combustion engine according to claim 1, further comprising:
- a flow-amount adjustment valve provided in an exhaust passage that includes an exhaust port, wherein an opening amount is adjusted to change a cross sectional area of the exhaust passage, thereby changing an amount of gas passing through the exhaust passage; and
- an adjustment-valve control portion that controls the flow-amount adjustment valve to decrease the opening amount of the flow-amount adjustment valve as the load on the internal combustion engine decreases.

7. A control apparatus for a four-stroke premixed compression ignition internal combustion engine, the control apparatus comprising:
- an intake-valve control portion that opens an intake valve at an intake-valve opening timing so that the intake valve is open during at least a portion of an intake stroke, and that closes the intake valve at an intake-valve closing timing; and
- an exhaust-valve control portion that includes a first exhaust-valve control portion and a second exhaust-control portion, wherein:
- the first exhaust-valve control portion opens a first exhaust valve at a first exhaust-valve opening timing so that the first exhaust valve is open during a portion of an exhaust stroke, and the first exhaust-valve control portion closes the first exhaust valve, at a first exhaust-valve closing timing that is near an exhaust top dead center;
- the second exhaust-valve control portion opens a second exhaust valve at a second exhaust-valve opening timing that is retarded with respect to the first exhaust-valve closing timing and the intake-valve opening timing, and is advanced with respect to the intake-valve closing timing, and the second exhaust-valve control portion closes the second exhaust valve, at a second exhaust-valve closing timing, and
    - the second exhaust-valve control portion retards the second exhaust-valve opening timing when a load on the internal combustion engine increases.

8. The control apparatus for the four-stroke premixed compression ignition internal combustion engine according to claim 7, wherein
- the internal combustion engine includes at least two intake valves; and
- the intake-valve control portion opens and closes only one of the at least two intake valves when the load on the internal combustion engine is below a predetermined threshold value.

9. The control apparatus for the four-stroke premixed compression ignition internal combustion engine according to claim 8, wherein
- the first exhaust-valve control portion opens and closes only the first exhaust valve, and retards the first exhaust-valve closing timing with respect to the intake-valve opening timing when the load on the internal combustion engine is below the predetermined threshold value; and
- the intake-valve control portion and the first exhaust-valve control portion select a pair of the intake valve and the exhaust valve, a distance between which is longest among distances between all pairs of the intake valve and the first exhaust valve, as the pair of the intake valve and the exhaust valve to be opened and closed, when the load on the internal combustion engine is below the predetermined threshold value.

10. The control apparatus for the four-stroke premixed compression ignition internal combustion engine according to claim 9, wherein
- the intake-valve control portion alternately opens and closes the at least two intake valves each time a predetermined period has elapsed, when the load on the internal combustion engine is below the predetermined threshold value; and
- the first exhaust-valve control portion alternately opens and closes the at least first and second exhaust valves each time the predetermined period has elapsed, when the load on the internal combustion engine is below the predetermined threshold value.

11. The control apparatus for the four-stroke premixed compression ignition internal combustion engine according to claim 9, wherein the second exhaust-valve control portion opens and closes both of the at least first and second valves.

12. The control apparatus for the four-stroke premixed compression ignition internal combustion engine according to claim 7, further comprising:
- a flow-amount adjustment valve provided in an exhaust passage that includes an exhaust port, wherein an opening amount is adjusted to change a cross sectional area of the exhaust passage, thereby changing an amount of gas passing through the exhaust passage; and
- an adjustment-valve control portion that controls the flow-amount adjustment valve to decrease the opening amount of the flow-amount adjustment valve as the load on the internal combustion engine decreases.

13. A method of controlling a four-stroke premixed compression ignition internal combustion engine under variable engine loads, comprising:
- opening an intake valve, using an intake valve control portion, at an intake-valve opening timing so that the intake valve is open during at least a portion of an intake stroke, and closing the intake valve at an intake-valve closing timing;
- opening an exhaust valve, using a first exhaust-valve control portion, at a first exhaust-valve opening timing so that the exhaust valve is open during a portion of an exhaust stroke, and closing the exhaust valve, at a first exhaust-valve closing timing that is near an exhaust top dead center; and
- opening the exhaust valve, using a second exhaust-control portion, at a second exhaust-valve opening timing, which is retarded with respect to the first exhaust-valve closing timing and the intake-valve opening timing, but is advanced with respect to the intake-valve closing timing, and closing the exhaust valve, at a second exhaust-valve closing timing, wherein
- the second exhaust-valve opening timing is retarded by the second exhaust-valve control portion as a load on the internal combustion engine increases.

14. The method according to claim 13, wherein
the internal combustion engine includes at least two intake valves and only one of the at least two intake valves is opened and closed by the intake-valve control portion when the load on the internal combustion engine is below a predetermined threshold value.

15. The method according to claim 14, wherein
the internal combustion engine includes at least two exhaust valves;
the first exhaust-valve closing timing is retarded with respect to the intake-valve opening timing by the first exhaust-valve control portion when the load on the internal combustion engine is below the predetermined threshold value; and a pair of the intake valve and the exhaust valve, a distance between which is longest among distances between all pairs of the intake valve and the exhaust valve, is selected by the intake-valve control portion and the first exhaust-valve control portion as the pair of the intake valve and the exhaust valve to be opened and closed, when the load on the internal combustion engine is below the predetermined threshold value.

16. The method according to claim 15, wherein the at least two intake valves are alternately opened and closed by the intake-valve control portion each time a predetermined period has elapsed, when the load on the internal combustion engine is below the predetermined threshold value; and the at least two exhaust valves are alternately opened and closed by the first exhaust-valve control portion each time the predetermined period has elapsed, when the load on the internal combustion engine is below the predetermined threshold value.

17. The method according to claim 15, wherein both of the at least two exhaust valves are opened and closed by the second exhaust valve control portion.

18. The method according to claim 13, further comprising:

decreasing a cross sectional area of an exhaust passage, by reducing an opening amount of a flow-amount adjustment valve provided in the exhaust passage, to reduce an amount of gas passing through the exhaust passage as the load on the internal combustion engine decreases.

19. A method of controlling a four-stroke premixed compression ignition internal combustion engine under variable engine loads, comprising:

opening an intake valve, using an intake valve control portion, at an intake-valve opening timing so that the intake valve is open during at least a portion of an intake stroke, and closing the intake valve at an intake-valve closing timing;

opening a first exhaust valve, using a first exhaust-valve control portion, at a first exhaust-valve opening timing so that the first exhaust valve is open during a portion of an exhaust stroke, and closing the first exhaust valve, at a first exhaust-valve closing timing that is near an exhaust top dead center; and opening a second exhaust valve, using a second exhaust-control portion, at a second exhaust-valve opening timing, which is retarded with respect to the first exhaust-valve closing timing and the intake-valve opening timing, but is advanced with respect to the intake-valve closing timing, and closing the second exhaust valve, at a second exhaust-valve closing timing, wherein the second exhaust-valve opening timing is retarded by the second exhaust-valve control portion as a load on the internal combustion engine increases.

20. The method according to claim 19, wherein the internal combustion engine includes at least two intake valves and only one of the at least two intake valves is opened and closed by the intake-valve control portion when the load on the internal combustion engine is below a predetermined threshold value.

21. The method according to claim 20, wherein the internal combustion engine includes at least two exhaust valves;

the first exhaust-valve closing timing is retarded with respect to the intake-valve opening timing by the first exhaust-valve control portion when the load on the internal combustion engine is below the predetermined threshold value; and a pair of the intake valve and the exhaust valve, a distance between which is longest among distances between all pairs of the intake valve and the exhaust valve, is selected by the intake-valve control portion and the first exhaust-valve control portion as the pair of the intake valve and the exhaust valve to be opened and closed, when the load on the internal combustion engine is below the predetermined threshold value.

22. The method according to claim 21, wherein the at least two intake valves are alternately opened and closed by the intake-valve control portion each time a predetermined period has elapsed, when the load on the internal combustion engine is below the predetermined threshold value; and the at least first and second exhaust valves are alternately opened and closed by the first exhaust-valve control portion each time the predetermined period has elapsed, when the load on the internal combustion engine is below the predetermined threshold value.

23. The method according to claim 21, wherein both of the at least first and second exhaust valves are opened and closed by the second exhaust valve control portion.

24. The method according to claim 19, further comprising:

decreasing a cross sectional area of an exhaust passage, by reducing an opening amount of a flow-amount adjustment valve provided in the exhaust passage, to reduce an amount of gas passing through the exhaust passage as the load on the internal combustion engine decreases.

* * * * *